United States Patent Office 2,813,141
Patented Nov. 12, 1957

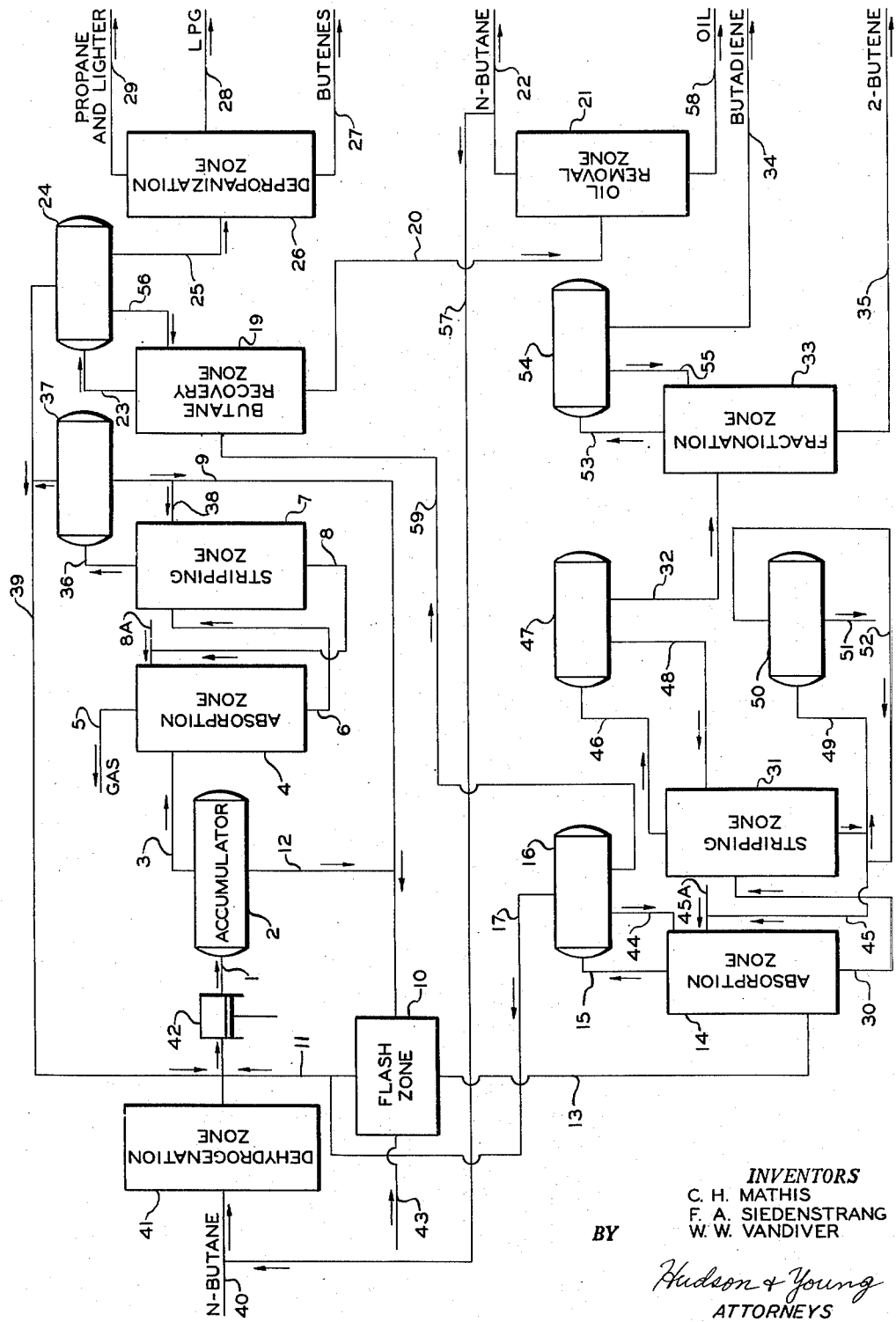

2,813,141

BUTANE RECOVERY FROM UNSATURATED HYDROCARBONS

Clyde H. Mathis, Fred A. Siedenstrang, and William W. Vandiver, Borger, Tex., assignors to Phillips Petroleum Company, a corporation of Delaware Application October 2, 1953, Serial No. 383,883

7 Claims. (Cl. 260—683.3)

This invention relates to the recovery of olefins, especially 2-butene, from an effluent from the dehydrogenation of a paraffin, especially normal butane. In one aspect, it relates to the prevention or reduction of polymer formation in distillation equipment associated with a process for the dehydrogenation of normal butane. In another aspect, it relates to the recovery of a purified normal butane stream for recycle in such a dehydrogenation process. In another aspect, it relates to the elimination of diluents, such as isobutane, from a feed stream to an olefin dehydrogenation process. In another aspect, it relates to a novel flow system for the resolution of an effluent from a butane dehydrogenation process.

The dehydrogenation of normal butane to produce butenes is well-known in the art. In prior art processes, it has been customary to subject a butane dehydrogenation effluent to fractional distillation to recover desired components present in the effluent. In prior art processes wherein such an effluent is subjected to fractional distillation, difficulties have arisen as a result of the formation and deposition of polymers in fractional distillation columns, particularly those columns which are used for the recovery of 1-butene and 2-butene and those used for removing propane. The polymers which form in these columns have the property of adhering tightly to surfaces of distillation equipment. Polymer deposition has been especially serious in the kettles associated with butene distillation columns. It has been necessary in many cases to remove the deposited polymer by burning. This has also necessitated undesirably frequent shutdowns of distillation equipment. Thus, the necessity of burning the polymer from the columns and kettles has resulted in increased maintenance costs, decreased life of the equipment involved, danger to personnel involved, and frequent replacement of equipment.

The chemical mechanism by which such polymer formation takes place is not completely understood. Apparently, the polymer formation arises from the presence of certain impurities, such as acetylenic compounds, present in the dehydrogenation effluent.

This invention provides a combination of process steps whereby the aforementioned polymer formation and attendant disadvantages are eliminated or minimized. Thus, the invention affects reduction of maintenance costs and an increase in the life of separation equipment, elimination of danger to personnel and a decrease in the frequency of equipment replacements. In addition, by the use of the process of this invention, the load on fractionation columns used for the recovery of 1-butene is decreased, certain diluents are eliminated from the 2-butene recovered as a product, branched chain compounds are isolated and removed from the separation system, and high purity normal butane and 2-butene are recovered as products.

According to this invention, an effluent from a dehydrogenation zone, in which normal butane is catalytically dehydrogenated to produce butenes, is subjected to absorption or extractive distillation in the presence of a solvent which is selected for 2-butene, prior to any fractional distillation of the effluent, and the products recovered from the absorption or extractive distillation are subsequently subjected to fractional distillation to recover the desired components. As the absorbent or the solvent in the extractive distillation, furfural is ordinarily preferred. However, other solvents known in the art which are selective for 2-butene in the presence of 1-butene and butanes can be used if desired.

The mechanism by which the process of this invention eliminates or reduces polymer formation is not completely understood, but is believed to involve the absorption of polymer-forming impurities in the furfural, such impurities possibly forming a soluble polymer in the furfural, which polymer is not released therefrom upon subsequent stripping and which does not deposit in fractionation equipment. It is, therefore, desirable to remove part of the furfural from the system and continuously purify the furfural by distillation. Thus, polymer-forming impurities are prevented from entering fractional distillation equipment and from forming polymer deposits therein.

The term "fractional distillation" as used in this specification and the claims means ordinary fractional distillation without the addition of solvents, extractants, entrainers, azeotrope formers, etc.

According to one modification of the invention, as applied to a process in which normal butane is catalytically dehydrogenated to produce 2-butene, the effluent from the dehydrogenation is treated to recover a $C_4$-and-heavier fraction containing small amounts of propane; the $C_4$-and-heavier fraction is subjected to extractive distillation in the presence of furfural to obtain a distillate comprising propane, butane, and 1-butene and a residual fraction comprising 2-butene together with small amounts of butadiene; the distillate is subjected to ordinary fractional distillation to recover a propane fraction, a butene fraction, and a purified normal butane fraction, which is recycled to the dehydrogenation step; the distillation residue is fractionated by ordinary fractional distillation to obtain a purified 2-butene stream and a minor fraction comprising butadiene.

One embodiment of the invention is illustrated diagrammatically in the drawing.

According to the drawing, normal butane enters dehydrogenation zone 41 through inlet 40 and is therein subjected to contact with a dehydrogenation catalyst such as chromia-alumina at a temperature in the range 1100 to 1250° F. The effluent from dehydrogenation zone 41 is compressed in compressor 42 and passed through line 1 to accumulator 2 wherein partial condensation takes place. A gas phase is passed through conduit 3 to absorption zone 4 in which it is contacted with a hydrocarbon solvent such as mineral seal oil and wherein the butanes and heavier materials together with smaller amounts of propane are absorbed in the oil. A gas fraction is withdrawn from the system through outlet 5. Enriched oil passes through conduit 6 to stripping zone 7 wherein absorbed materials are stripped from the oil and removed through conduit 36. Stripped oil is recycled to absorption zone 4 through conduit 8, makeup oil being added through inlet 8A. The $C_4$-and-heavier fraction from stripper 7 is passed to accumulator 37 wherein $C_3$-$C_4$ condensate is collected. Any uncondensed gas is recycled through conduit 39. Condensed $C_3$ and $C_4$ are passed through conduit 9 to flash zone 10, part being returned through conduit 38 to stripping zone 7 as reflux. Condensed $C_3$ and $C_4$ from accumulator 37 are admixed with a liquid phase from accumulator 2 and passed to flash zone 10 wherein part of the $C_3$'s and any lighter material are removed and recycled through conduit 11. Additional propane-containing material can be passed to flash zone 10 through inlet 43. The additional material can be, for example, a depropanizer overhead fraction obtained during the resolution of a butene dehydrogenation effluent. Liquid material from flash zone 10, containing unreacted normal butane, 2-butene, and 1-butene, together with smaller amounts of propane, butadiene, isobutylene, and isobutane as well as any polymer-forming impurities is passed through conduit 13 to absorption zone 14 wherein the mixture is subjected to extractive distillation in the presence of furfural. In absorption zone 14, the 2-butene, together with small amounts of butadiene and any polymer-forming impurities are absorbed in the furfural. Unabsorbed materials including normal butane, propane, 1-butene, isobutane, and isobutylene are removed overhead as a distillate fraction and passed to accumulator 16 wherein condensate is collected, any uncondensed gases being recycled through conduit 17. Part of the condensed material can be returned to absorption zone 14 through conduit 44. The condensed distillate is passed through conduit 59 to butane recovery zone 19, which is ordinarily one or more fractional distillation columns. A distillate product comprising propane, isobutane, and 1-butene is removed overhead through conduit 23 and passed to accumulator 24 in which condensate is collected, any uncondensed material being recycled through conduit 39. Part of the condensed distillate is returned through conduit 56 as reflux. Distillation product is passed through conduit 25 to depropanizer zone 26 which is ordinarily a fractional distillation column. Part of the propane and any lighter materials are withdrawn overhead through conduit 29. A side stream comprising propane is withdrawn as liquefied petroleum gas product through conduit 28. A bottom fraction comprising 1-butene, isobutane and isobutylene is removed through conduit 27 and can be subjected to further purification or used as a feed for a paraffin alkylation plant.

A bottom fraction consisting of normal butane together with heavier impurities is withdrawn from butane recovery zone 19 through conduit 20 and passed to oil removal zone 21 from which a highly purified normal butane distillate is withdrawn through conduit 22 and oil impurities are withdrawn through outlet 58. Part or all of the normal butane can be recycled through conduit 57 to dehydrogenation zone 41. This recycle stream is high purity normal butane containing only very small amounts of diluents and is therefore a highly desirable recycle stream.

Enriched furfural containing dissolved 2-butene and butadiene is withdrawn from absorption zone 14 through conduit 30 and passed to stripping zone 31 wherein the dissolved butadiene and 2-butene are removed from solution and withdrawn overhead through conduit 46 to accumulator 47 wherein condensate is collected. Stripped furfural is withdrawn from stripping zone 31 and recycled to absorption zone 14 through conduit 45, any fresh furfural needed to make up for losses being added through inlet 45A.

Part of the stripped furfural is passed through conduit 49 to purification zone 50 wherein it is purified by distillation, i. e. freed of any heavy polymeric impurities which are withdrawn through outlet 51. Purified furfural is recycled through conduit 52.

Part of the condensed material in accumulator 47 is returned to stripping zone 31 as reflux through conduit 48. The remainder is passed through conduit 32 to fractionation zone 33 from which a highly purified 2-butene stream is withdrawn as a distillation residue through conduit 35 and used as feed for the production of butadiene or for any other desired use. An overhead fraction consisting primarily of by-product butadiene is withdrawn as distillate through conduit 53 and passed to accumulator 54 where condensate is collected. Part of the condensed product is returned to fractionation zone 33 as reflux through conduit 55. The remainder is withdrawn as a by-product through outlet 34.

*Example*

In the system shown in the drawing, streams having the following composition are recovered:

| Composition, Mol Percent | Recycle n-Butane | 2-Butene Product |
|---|---|---|
| Isobutene | 1.0 | 1.0 |
| 1-Butene | | |
| Butadiene | 0.1 | 0.2 |
| n-Butane | 97.2 | 3.6 |
| 2-Butene | 1.7 | 95.2 |
| | 100.0 | 100.0 |

In a process wherein a butane dehydrogenation effluent is subjected to fractional distillation to remove propane and 1-butene and recover 2-butene prior to any extractive distillation or treatment with a solvent, the purity of the n-butane recycle stream is 97 mol percent and the purity of the 2-butene product is 88.0 mol percent. Furthermore, polymer deposition in the depropanization and 1-butene columns causes frequent shut-downs for removal of polymer.

The advantage of this invention in producing a 2-butene product of increased purity is evident. Furthermore, recycle n-butane purity is maintained at a high value.

Variation and modification are possible within the scope of the disclosure and the claims to this invention, the essence of which is that, in a process wherein a paraffin, especially butane, is dehydrogenated to produce an olefin, especially 2-butene, the dehydrogenation effluent is subjected to contact with a solvent selective for said olefin prior to any fractional distillation of said effluent. The invention is applicable to the dehydrogenation of normal paraffins other than normal butane.

While certain process steps, structures, and examples have been described for purposes of illustration, the invention is clearly not limited thereto.

We claim:

1. A process which comprises dehydrogenating normal butane in a dehydrogenation zone to obtain a product mixture containing butanes, 1-butene, and 2-butene, together with minor amounts of butadiene, propane, and materials lower boiling than propane; partially condensing said mixture to obtain a vapor phase and a liquid phase; recovering from said vapor phase a $C_4$-and-heavier fraction containing minor amounts of propane; admixing said $C_4$-and-heavier fraction with said liquid phase, the resulting mixture containing hydrocarbons which readily polymerize under fractional distillation and extractive distillation conditions; subjecting the resulting mixture, prior to any fractional distillation thereof, to extractive distillation in the presence of furfural under conditions which polymerize readily polymerizable hydrocarbon therein and maintain the resulting polymer in solution in said furfural; recovering an extract comprising 2-butene and butadiene and a distillate comprising propane, butanes, and 1-butene; subjecting said extract to fractional distillation to recover butadiene as an overhead fraction and 2-butene as a residue fraction; fractionally distilling said distillate to obtain a propane, a butene, and a normal butane fraction; and recycling said normal butane fraction to said dehydrogenation zone.

2. A process according to claim 1 wherein said vapor phase is contacted with a hydrocarbonaceous absorption oil to absorb said $C_4$-and-heavier fraction of said $C_4$-and-heavier fraction is recovered by stripping said oil.

3. In a process wherein normal butane is dehydrogenated to produce butenes, the improvement which comprises subjecting a dehydrogenation product comprising butane, butenes, and other hydrocarbons which readily polymerize under fractional distillation and solvent extraction conditions, prior to any fractional distillation thereof, to contact with a hydrocarbon absorption oil to absorb a $C_4$-and-heavier fraction therefrom; recovering said $C_4$-and-heavier fraction from the resulting rich absorption oil; subjecting the recovered $C_4$-and-heavier fraction to solvent extraction with a solvent which absorbs 2-butene and polymer formed in the solvent extraction step;

separately recovering absorbed 2-butene and solvent containing dissolved polymer; and fractionally distilling the unabsorbed material to recover a butene fraction and purified normal butane in the absence of appreciable polymer formation.

4. The process of claim 3 wherein the solvent comprises furfural.

5. The process of claim 3 including the steps of distilling the 2-butene from the extract-rich furfural so as to leave the polymer in solution in said furfural; and separating said polymer from said furfural.

6. In a process wherein a paraffin is dehydrogenated to obtain an olefin, there being present in the effluent from the dehydrogenation step hydrocarbons lighter than said paraffin and hydrocarbons which readily polymerize under fractional distillation and solvent extraction conditions, and wherein the dehydrogenation effluent is subjected to separation steps comprising fractional distillation and solvent extraction, the improvement comprising subjecting said effluent to contact with a hydrocarbon absorption oil to absorb a $C_4$-and-heavier fraction therefrom; stripping said fraction from said oil; subjecting said fraction to solvent extraction with a solvent which dissolves the polymer formed in the extraction step; recovering an extract containing polymer in solution and a raffinate from said solvent extraction; and recovering $C_4$ hydrocarbon from at least one of said extracts and said raffinate by fractional distillation in the absence of appreciable polymerization of hydrocarbon material.

7. The process of claim 6 wherein said paraffin comprises n-butane and said solvent comprises furfural.

References Cited in the file of this patent

UNITED STATES PATENTS

| | | |
|---|---|---|
| 2,285,785 | Seguy | June 9, 1942 |
| 2,395,016 | Schulze et al. | Feb. 9, 1946 |
| 2,415,006 | Hachmuth | Jan. 28, 1947 |
| 2,419,039 | Scarth | Apr. 15, 1947 |
| 2,519,343 | Berg | Aug. 22, 1950 |